(No Model.)
J. F. FINKBEINER.
Tool for Lumbermen.
No. 235,076. Patented Dec. 7, 1880.
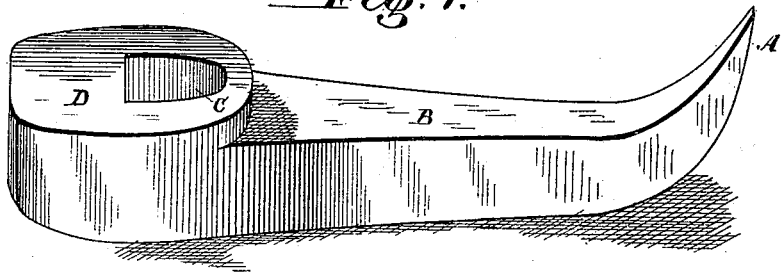
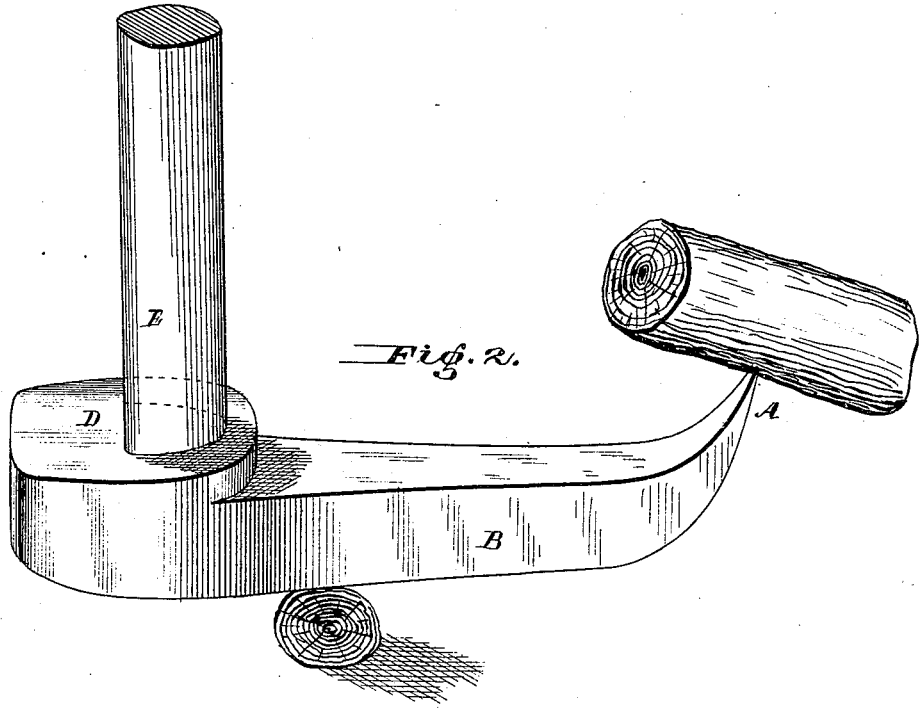

UNITED STATES PATENT OFFICE.

JOHN F. FINKBEINER, OF CLEARFIELD, PENNSYLVANIA.

TOOL FOR LUMBERMEN.

SPECIFICATION forming part of Letters Patent No. 235,076, dated December 7, 1880.

Application filed October 18, 1880. (No model.)

*To all whom it may concern:*

Be it known that I, JOHN F. FINKBEINER, a citizen of the United States, residing at Clearfield, in the county of Clearfield and State of Pennsylvania, have invented certain new and useful Improvements in Tools for Lumbermen; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to furnish an implement especially adapted for the use of lumbermen—a serviceable tool for raising timber, logs, and other heavy objects, drawing or extracting small stumps and roots, and one which can also be employed for turning or rolling timber and logs, for driving pins or dogs into the same, and for drawing or pulling small logs.

The improved tool has an elongated body portion, provided at one end with a hammer-head and a handle-socket, and it is bent or turned upward at the other end to form a point or hook, as will be hereinafter more fully described.

In the drawings, Figure 1 is a perspective view of an implement made according to my invention. Fig. 2 is a similar view, showing the position of the implement when in use for lifting an object.

The body portion of the implement consists of a narrow bar, B, the front end of which is turned in an upward direction, so as to form a point or hook, A. This point or hook is faced with steel, or a steel point may otherwise be formed on the iron body portion B. The opposite end of the body B is suitably enlarged laterally and vertically, so as to form a head, D, which serves as a hammer or maul. This head is provided with an eye or socket, C, for the reception of a vertical handle, E. The striking-face of the hammer is also made of steel, or the entire head may be of this metal.

When the implement is used for the purpose of lifting or moving an object along the ground the point thereof is placed under said object and the central portion of the body made to rest upon a fulcrum, which may be a stone or a piece of wood; then, by applying a backward and downward pressure to the upper end of the handle, the implement is turned on its fulcrum so as to cause the pointed end thereof to exert a lifting force on the object to be moved.

In drawing roots from the ground the implement may rest directly upon the ground, the point in this instance being made to seize or penetrate the root, when, by applying a backward and downward pressure upon the handle, the extraction of the root is insured.

When the implement is intended to serve as a means for drawing or pulling small logs and other objects it is partially inverted, so as to cause the point or hook to enter the top of the object to be moved.

For driving pins, dogs, and other objects into the ground the hammer-face is properly presented by inverting the implement, or the blows may be given by using the same in the manner of a tamping-iron.

Other uses of the implement will readily suggest themselves. It possesses great practical utility, owing to its simplicity of construction and lightness. It is more specially designed for the use of logmen or timbermen for performing the operations above stated; but it can be applied to other uses, such as raising railroad-ties and pushing cars.

Having thus described my invention, what I claim as new, and desire to secure by Letters Patent, is—

The implement herein described, consisting of the elongated body B, having the upwardly-turned point or hook A, and the head D, provided with socket C, and handle E, as and for the purpose set forth.

In testimony whereof I affix my signature in presence of two witnesses.

JOHN FR' FINKBEINER.

Witnesses:
J. F. SNYDER,
A. M. BLOOM.